United States Patent
Tavildar et al.

(10) Patent No.: US 9,924,511 B2
(45) Date of Patent: Mar. 20, 2018

(54) LISTEN-BEFORE-TALK FOR LTE DIRECT ON UNLICENSED RADIO FREQUENCY SPECTRUM BAND

(71) Applicant: QUALCOMM Incorporated, San Diego, CA (US)

(72) Inventors: Saurabha Rangrao Tavildar, Jersey City, NJ (US); Junyi Li, Chester, NJ (US); Jay Rodney Walton, Carlisle, MA (US); Santosh Paul Abraham, San Diego, CA (US)

( * ) Notice: Subject to any disclaimer, the term of this patent is extended or adjusted under 35 U.S.C. 154(b) by 107 days.

(21) Appl. No.: 14/861,819

(22) Filed: Sep. 22, 2015

(65) Prior Publication Data
US 2017/0086194 A1    Mar. 23, 2017

(51) Int. Cl.
| | |
|---|---|
| H04W 72/04 | (2009.01) |
| H04L 29/08 | (2006.01) |
| H04W 76/02 | (2009.01) |
| H04W 74/08 | (2009.01) |
| H04W 84/12 | (2009.01) |
| H04W 16/14 | (2009.01) |

(52) U.S. Cl.
CPC ....... *H04W 72/0446* (2013.01); *H04L 67/104* (2013.01); *H04W 72/0453* (2013.01); *H04W 74/0808* (2013.01); *H04W 76/023* (2013.01); *H04W 16/14* (2013.01); *H04W 84/12* (2013.01)

(58) Field of Classification Search
CPC ......... H04W 72/0446; H04W 72/0453; H04W 76/023; H04W 84/12; H04L 67/104
See application file for complete search history.

(56) References Cited

U.S. PATENT DOCUMENTS

| | | | |
|---|---|---|---|
| 8,917,705 B2 | 12/2014 | Merlin et al. | |
| 2013/0315152 A1 | 11/2013 | Ratasuk et al. | |
| 2014/0112289 A1* | 4/2014 | Kim | H04W 16/14 |
| | | | 370/329 |
| 2015/0057011 A1 | 2/2015 | Di et al. | |
| 2015/0085836 A1* | 3/2015 | Kang | H04W 74/0808 |
| | | | 370/336 |
| 2015/0098437 A1 | 4/2015 | Chen et al. | |
| 2015/0124785 A1 | 5/2015 | Merlin et al. | |

(Continued)

OTHER PUBLICATIONS

ISA/EP, International Search Report and Written Opinion of the International Searching Authority, Int'l Application No. PCT/US2016/045799, Oct. 17, 2016, European Patent Office, Rijswijk, NL, 10 pgs.

*Primary Examiner* — Michael Thier
*Assistant Examiner* — Brian P Cox
(74) *Attorney, Agent, or Firm* — Holland & Hart LLP

(57) ABSTRACT

Methods, systems, and devices are described for direct device-to-device (D2D) communications in a subframe on a channel in an unlicensed radio frequency spectrum band. A user equipment (UE) may perform a listen-before-talk (LBT) procedure on the channel in the unlicensed radio frequency spectrum band. The UE may identify a time period between a completion of the LBT procedure and a boundary of a second subframe. The UE may transmit a Wi-Fi preamble and a variable length message on the channel during the identified timer period. The variable length message may include a duration that is time aligned with the boundary of the second subframe.

34 Claims, 8 Drawing Sheets

(56) References Cited

U.S. PATENT DOCUMENTS

| | | | | |
|---|---|---|---|---|
| 2015/0195849 A1* | 7/2015 | Bashar | ................. | H04W 16/14 |
| | | | | 370/330 |
| 2016/0095110 A1* | 3/2016 | Li | ..................... | H04W 72/1215 |
| | | | | 370/329 |
| 2016/0338104 A1* | 11/2016 | Yin | ................... | H04W 72/0446 |
| 2017/0238311 A1* | 8/2017 | Hooli | ............... | H04W 72/0446 |
| 2017/0245303 A1* | 8/2017 | Falconetti | ......... | H04W 74/0891 |

* cited by examiner

LISTEN-BEFORE-TALK FOR LTE DIRECT ON UNLICENSED RADIO FREQUENCY SPECTRUM BAND

BACKGROUND

Field of the Disclosure

The present disclosure, for example, relates to wireless communication systems, and more particularly to a listen-before-talk mechanism that supports direct communications on an unlicensed radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station). UEs may communicate directly with each other using direct-to-direct (D2D) communications over a direct D2D wireless link.

Current implementations provide for D2D communications in band(s) of a licensed radio frequency spectrum and/or an unlicensed radio frequency spectrum band. Communications in the unlicensed radio frequency spectrum band, however, may comply with various requirements regarding medium access procedures, for example. The UEs may synchronize their D2D communications using wireless wide area network (WWAN) resources, e.g., LTE bands.

SUMMARY

The described features generally relate to one or more improved methods, systems, devices, or apparatuses that provide a listen-before-talk (LBT) mechanism for direct D2D communications on a channel in an unlicensed radio frequency spectrum band. Generally, the improved methods provide for a UE to perform the LBT procedure on the channel during a subframe and fill the remaining time of the subframe (e.g., the time after the LBT procedure is complete until the start of the next subframe) by sending a message. Thus, the UE may initiate the LBT procedure (e.g., a clear channel assessment (CCA) procedure) at the start of, or during, a subframe and determine that the LBT procedure has completed. The duration of any given LBT procedure may vary, e.g., due to signal detections, different backoff times, etc. The UE may calculate the time remaining in the subframe until the start of the next subframe. The UE may then transmit a Wi-Fi preamble and a variable length message. The length of the variable length message may be selected to fill the remaining time during the subframe. At the start of the next subframe, the UE may transmit its direct D2D communications (e.g., data message) to the receiving UE in the subframe that is aligned in the subframe boundary. Thus, the improved method improves frequency division multiplexing properties while maintaining synchronous transmissions in the subframe.

In a first illustrative set of examples, a method for wireless communication is provided. The method may include: performing a listen-before-talk (LBT) procedure on a channel in an unlicensed radio frequency spectrum band; identifying a time period between a completion of the LBT procedure and a boundary of a second subframe; and transmitting a Wi-Fi preamble and a variable length message on the channel during the identified time period, the variable length message comprising a duration that is time aligned with the boundary of the second subframe.

In some aspects, the method may include selecting the duration of the variable length message based at least in part on a fixed LBT procedure time, an actual LBT procedure time, and a Wi-Fi preamble time. The method may include selecting the duration of the variable length message to time align frames transmitted on the channel with frames transmitted on a channel in a licensed radio frequency spectrum band. The method may include selecting a pseudo-random backoff interval associated with the LBT procedure, the pseudo-random backoff interval selected based at least in part on a system time associated with communications on the channel.

In some aspects, the method may include transmitting a clear-to-send-to-self (CTS-S) information element in the Wi-Fi preamble, the CTS-S information element configured to reserve the channel during a remaining portion of the time period. The CTS-S information element may include a fixed destination address selected to reserve the channel during the remaining portion of the time period. The method may include decoding, during the LBT procedure, a header portion of one or more received Wi-Fi signals; and determining that the LBT procedure is complete based at least in part on the decoded header portion. The channel is associated with device-to-device (D2D) direct communications in the unlicensed radio frequency spectrum band.

In a second illustrative set of examples, an apparatus for wireless communication is provided. The apparatus may include: a processor; memory in electronic communication with the processor; and instructions stored in the memory. The instructions being executable by the processor to: perform a listen-before-talk (LBT) procedure on a channel in an unlicensed radio frequency spectrum band; identify a time period between a completion of the LBT procedure and a boundary of a second subframe; and transmit a Wi-Fi preamble and a variable length message on the channel during the identified time period, the variable length message comprising a duration that is time aligned with the boundary of the second subframe.

In some aspects, the apparatus may include instructions executable by the processor to select the duration of the variable length message based at least in part on a fixed LBT procedure time, an actual LBT procedure time, and a Wi-Fi preamble time. The apparatus may include instructions executable by the processor to select the duration of the variable length message to time align frames transmitted on the channel with frames transmitted on a channel in a licensed radio frequency spectrum band. The apparatus may include instructions executable by the processor to select a pseudo-random backoff interval associated with the LBT procedure, the pseudo-random backoff interval selected based at least in part on a system time associated with communications on the channel.

In some aspects, the apparatus may include instructions executable by the processor to transmit a clear-to-send-to-self (CTS-S) information element in the Wi-Fi preamble, the CTS-S information element configured to reserve the channel during a remaining portion of the time period. The CTS-S information element may include a fixed destination address selected to reserve the channel during the remaining portion of the time period.

In some aspects, the apparatus may include instructions executable by the processor to decoding, during the LBT procedure, a header portion of one or more received Wi-Fi signals; and determining that the LBT procedure is complete based at least in part on the decoded header portion. The channel is associated with device-to-device (D2D) direct communications in the unlicensed radio frequency spectrum band.

In a third illustrative set of examples, an apparatus for wireless communication is provided. The apparatus may include: means for performing a listen-before-talk (LBT) procedure on a channel in an unlicensed radio frequency spectrum band; means for identifying a time period between a completion of the LBT procedure and a boundary of a second subframe; and means for transmitting a Wi-Fi preamble and a variable length message on the channel during the identified time period, the variable length message comprising a duration that is time aligned with the boundary of the second subframe.

In some aspects, the apparatus may include means for selecting the duration of the variable length message based at least in part on a fixed LBT procedure time, an actual LBT procedure time, and a Wi-Fi preamble time. The apparatus may include means for selecting the duration of the variable length message to time align frames transmitted on the channel with frames transmitted on a channel in a licensed radio frequency spectrum band. The apparatus may include means for selecting a pseudo-random backoff interval associated with the LBT procedure, the pseudo-random backoff interval selected based at least in part on a system time associated with communications on the channel.

In some aspects, the apparatus may include means for transmitting a clear-to-send-to-self (CTS-S) information element in the Wi-Fi preamble, the CTS-S information element configured to reserve the channel during a remaining portion of the time period. The CTS-S information element may include a fixed destination address selected to reserve the channel during the remaining portion of the time period.

In some aspects, the apparatus may include means for decoding, during the LBT procedure, a header portion of one or more received Wi-Fi signals; and means for determining that the LBT procedure is complete based at least in part on the decoded header portion. The channel is associated with device-to-device (D2D) direct communications in the unlicensed radio frequency spectrum band.

In a fourth illustrative set of examples, a non-transitory computer-readable medium storing computer-executable code for wireless communication is provided. The code executable by a processor to: perform a listen-before-talk (LBT) procedure on a channel in an unlicensed radio frequency spectrum band; identify a time period between a completion of the LBT procedure and a boundary of a second subframe; and transmit a Wi-Fi preamble and a variable length message on the channel during the identified time period, the variable length message comprising a duration that is time aligned with the boundary of the second subframe.

In some aspects, the non-transitory computer-readable medium may include code executable by the processor to: select the duration of the variable length message based at least in part on a fixed LBT procedure time, an actual LBT procedure time, and a Wi-Fi preamble time. The non-transitory computer-readable medium may include code executable by the processor to: select the duration of the variable length message to time align frames transmitted on the channel with frames transmitted on a channel in a licensed radio frequency spectrum band. The non-transitory computer-readable medium may include code executable by the processor to: select a pseudo-random backoff interval associated with the LBT procedure, the pseudo-random backoff interval selected based at least in part on a system time associated with communications on the channel.

In some aspects, the non-transitory computer-readable medium may include code executable by the processor to: transmit a clear-to-send-to-self (CTS-S) information element in the Wi-Fi preamble, the CTS-S information element configured to reserve the channel during a remaining portion of the time period. The CTS-S information element may include a fixed destination address selected to reserve the channel during the remaining portion of the time period.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Long term evolution (LTE) device-to-device (D2D) communications in the unlicensed radio frequency spectrum band (DU communications) may include a network (e.g., base station) providing synchronization information to the UEs to align D2D communications in the subframe. Communications in an unlicensed frequency spectrum band, however, typically must comply with various regulations. For example, one regulatory requirement relates to medium access control where the sending device must perform a listen-before-talk (LBT) procedure prior to accessing a medium. The device may listen on the medium (or channel) to determine if it is idle before transmitting on the medium.

The duration of any given LBT procedure, e.g., the time it takes the UE to determine the channel is available, may vary due to backoff parameters, differences in detected energy, etc. This may be problematic when the UE is attempting to maintain subframe alignment for its data transmission. Currently, LTE D2D communication protocols are not configured to comply with such regulatory requirements associated with unlicensed frequency spectrum band transmissions.

According to aspects of the present disclosure, one or more devices of a wireless communication may be configured for performing D2D communications in an unlicensed radio frequency spectrum band. For example, a device, such as a UE, may employ a LBT procedure (e.g., a clear channel assessment (CCA) procedure) in a subframe on an unlicensed channel. The UE may transmit a Wi-Fi preamble and a variable length message in the subframe after the LBT procedure. The UE may select a duration of the variable length message that time aligns the end of the variable length message with the subframe, e.g., the variable length message ends in the current subframe and at the beginning of the next subframe. The UE may transmit its direct unlicensed (DU) communications, e.g., data message, in the next subframe that is aligned with the subframe. As can be appreciated, the duration of the variable length message may be selected based on the actual time for the LBT procedure, the time associated with the Wi-Fi preamble message, and the length of the subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
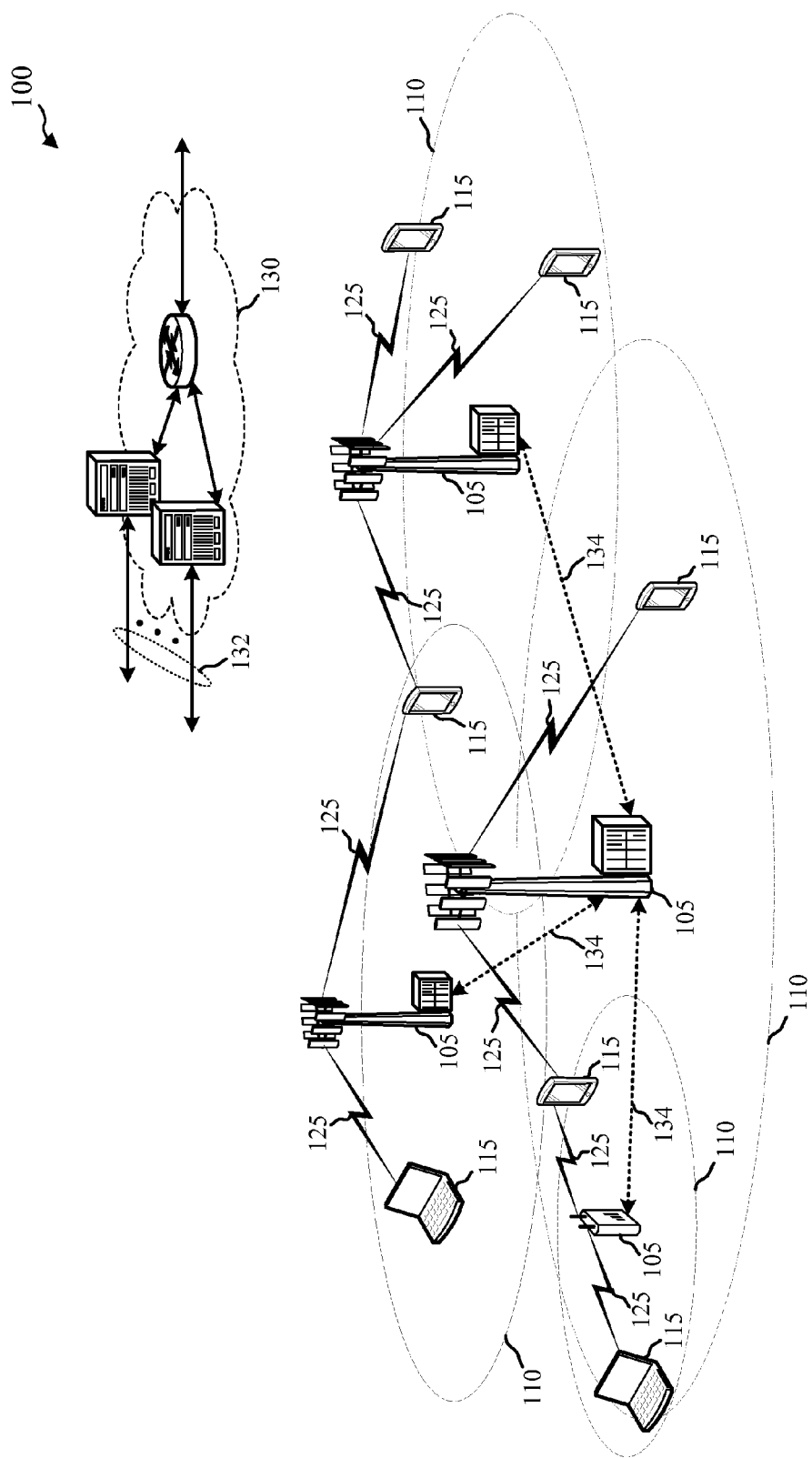
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions.

The base stations 105 interface with the core network 130 through backhaul links 132 (e.g., S1, etc.) and may perform radio configuration and scheduling for communication with the UEs 115, or may operate under the control of a base station controller. In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area. The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplexing (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 may support D2D communications in an unlicensed radio frequency spectrum band (unlicensed band). For example, a UE 115 may communicate with a neighboring UE 115 via a direct wireless link, e.g., a PC5 interface link, on a channel in the unlicensed band. The UE 115 may perform D2D communications in a manner which is consistent with D2D communication protocols and which complies with regulatory requirements for communicating in the unlicensed band. For example, the UE 115 may perform a LBT procedure on the channel in the unlicensed band to comply with medium access regulatory requirements. The LBT procedure, e.g., a CCA procedure, may be performed in a subframe that is synchronized among UEs 115 participating in the D2D communications in the unlicensed band. The UE 115 may identify the remaining time in the subframe once the LBT procedure is complete, e.g., the time until the next subframe begins. The UE 115 may then transmit a Wi-Fi preamble and a variable length message on the channel in the unlicensed band during the remaining subframe time period. The duration or length of the variable length message may be selected based on the remaining subframe time, e.g., selected to fill the remaining time following the LBT procedure and Wi-Fi preamble transmission. The UE 115 may transmit its information (e.g., control and/or data information) messages in the next subframe.

Figure 2:
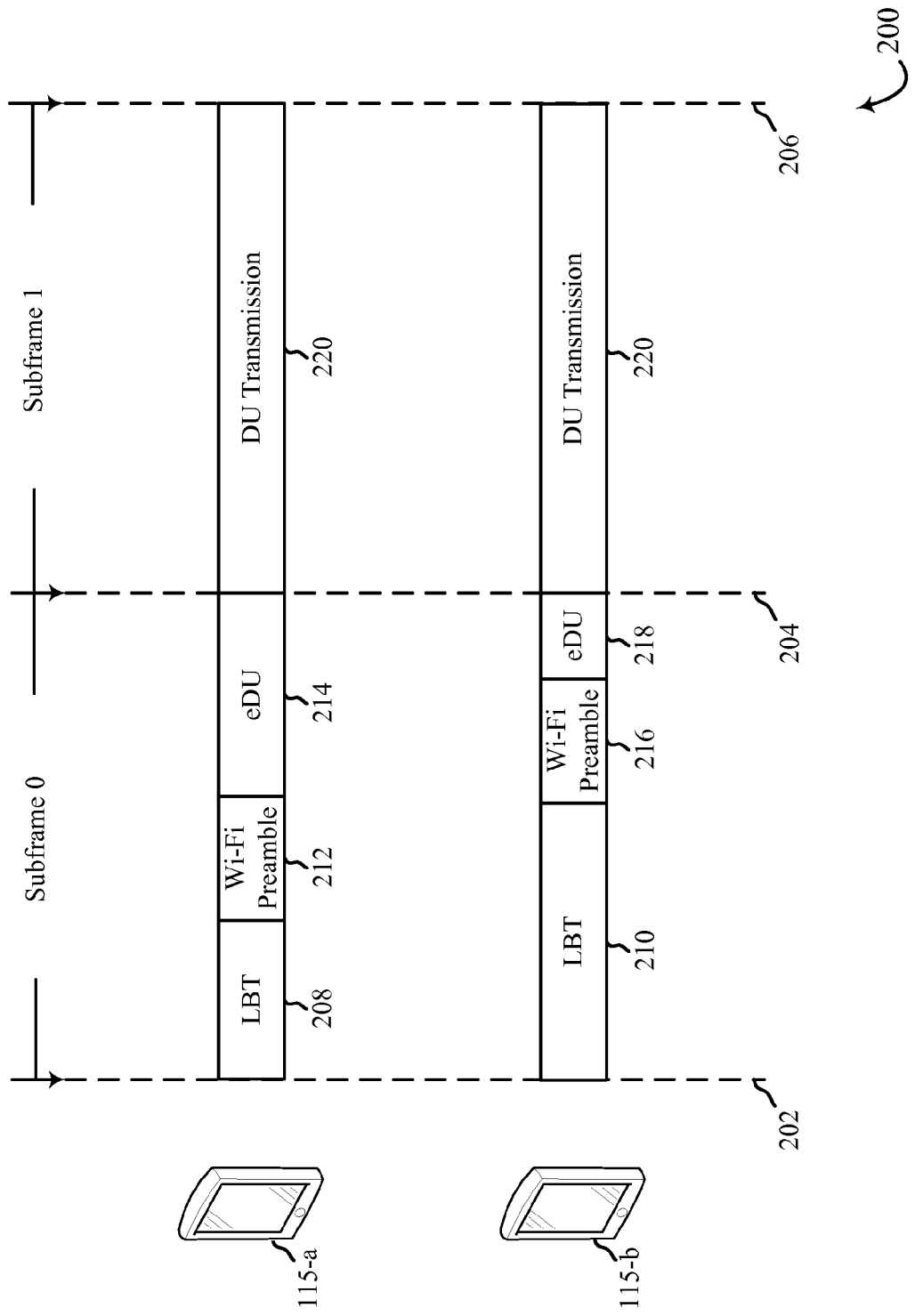
FIG. 2 shows a diagram of an example listen-before-talk mechanism for direct communications in an unlicensed radio frequency spectrum band, in accordance with various aspects of the present disclosure.

FIG. 2 is a diagram 200 that shows an example of an LBT procedure on a channel in an unlicensed band that supports synchronized message transmission in a wireless communication system, in accordance with various aspects of the present disclosure. The diagram 200 may illustrate aspects of the wireless communications system 100 described with reference to FIG. 1. Diagram 200 includes two wireless nodes, illustrated as UEs 115-*a* and 115-*b*. UEs 115-*a* and/or 115-*b* may be configured for direct D2D communications on a channel in an unlicensed band. UEs 115-*a* and/or 115-*b* may be examples of a UE 115 described with reference to FIG. 1. In some examples, a system device, such as one of the UEs 115 may execute one or more sets of codes to control the functional elements of the device to perform some or all of the functions described below.

Generally, diagram 200 shows a LBT procedure performed on a channel un an unlicensed band that is followed by transmission of a Wi-Fi preamble and variable length message. Generally, the LBT procedure is performed during subframe 0, which spans the period between 202 and 204. Data transmission occurs during subframe 1, which spans the period between 204 and 206. Although diagram 200 shows an example of two subframes, it is to be understood that the described techniques are not limited to two subframes and instead may occur over fewer than two subframes or more than two subframes.

UEs 115-*a* and 115-*b* may have traffic to communicate to another UE on a channel in an unlicensed band. UEs 115-*a* and 115-*b* may start LBT procedures 208 and 210, respectively, on the channel to determine that the channel in the unlicensed band is available. The LBT procedures 208 and/or 210 may be CCA procedures and/or may include decoding header information to identify a source of any interfering transmission. UE 115-a may determine that the channel is available based on its LBT procedure 208. UE 115-b may also determine that its channel is available based on its LBT procedure 210. However, LBT procedure 210 may have taken longer than LBT procedure 208, e.g., may have occupied more of subframe 0 than LBT procedure 208. For example, LBT procedure 208 may have detected no signals and therefore completed as quickly as possible, dependent on LBT configuration. LBT procedure 210, however, may have detected another transmission that ended during the LBT procedure 210. Therefore, LBT procedure 210 may have employed one or more backoff parameters that extended the duration of LBT procedure 210.

In some aspects, LBT procedures 208 and/or 210 may use a same pseudo-random backoff value for UEs 115-a and 115-b, respectively. In other aspects, the LBT procedures 208 and/or 210 may use a different pseudo-random backoff value for UEs 115-a and 115-b, respectively. In some examples, the pseudo-random backoff value may be an integer selected from a uniform distribution over the interval [0,CW], where CW refers to the contention window and is an integer within the range of values of the physical (PHY) layer characteristics aCWmin and aCWmax. The CW may be greater than aCWmin and less than aCWmax. Statistical independence among the random number streams among UEs 115 (e.g., UEs 115-a and/or 115-b) may be considered.

Once LBT procedure 208 is complete, UE 115-a may determine the amount of time left during subframe 0, e.g., the remaining time during the subframe. UE 115-a may then transmit a Wi-Fi preamble 212 and a variable length message 214 (identified as an extended direct unlicensed (eDU) message). UE 115-a may select a duration of the variable length message 214 based on the amount of time left during subframe 0. For example, UE 115-a may subtract the actual LBT procedure 208 time and the time associated with the Wi-Fi preamble 212 from the duration of subframe 0. Thus, UE 115-a may configure the variable length message 214 to have a duration corresponding to the remaining time in the subframe 0. That is, the UE 115-a may select a duration of the variable length message 214 that time aligns the variable length message 214 with the boundary of subframe 1.

Similarly, UE 115-b may follow LBT procedure 210 by transmitting Wi-Fi preamble 216 and variable length message 218. UE 115-b may also select a duration of the variable length message 218 that time aligns the variable length message 218 with the boundary of subframe 1. As shown in diagram 200, however, the duration of variable length message 214 is different from the duration of variable length message 218 due to the actual LBT procedure 210 time being longer (occupying more of subframe 0) than LBT procedure 208. Thus, the variable length messages 214 and 218 provide for UEs 115-a and 115-b to transmit DU messages 220 and 222, respectively, on a channel in the unlicensed band that maintain synchronization and frame alignment.

In some aspects, the variable length messages 214 and/or 218 may include a pilot signal transmission and/or transmission of buffered data. Other aspects may provide for the UEs 115-a and 115-b to include other information in the variable length messages 214 and/or 218, respectively. In some configurations, UEs 115 configured for communications on a channel in the unlicensed band may also be configured to ignore the variable length messages 214 and/or 218. Other configurations may include data included in the variable length messages 214 and/or 218.

In one example, the UEs 115-a and/or 115-b may determine that the subframe duration is X milliseconds and identify a maximum LBT procedure period that is not a multiple of the subframe duration (e.g., X*1.5). The duration of the variable length messages may be determined based on the maximum LBT procedure period minus the actual LBT procedure time and minus the duration of the Wi-Fi preamble message. In another example, the UEs 115-a and/or 115-b may determine that the subframe duration is X milliseconds. The duration of the variable length messages may be determined based on the subframe duration minus the actual LBT procedure time and minus the duration of the Wi-Fi preamble message.

In some aspects, the Wi-Fi preambles 212 and/or 216 may include a fixed destination address. UEs 115 configured for communications on a channel in the unlicensed band may also be configured to ignore the Wi-Fi preambles 212 and/or 216. Other configurations may include information in the Wi-Fi preambles 212 and/or 216 usable by the UEs 115, e.g., timing synchronization information, channel condition information, data buffer size information, etc. In some examples, the Wi-Fi preamble messages may include a clear-to-send-to-self (CTS-S) information element that acts to reserve the channel in the unlicensed band during the remaining portion of the subframe.

It is to be understood that the description above relating to UEs 115-a and 115-b is illustrative only and shows the duration differences in the variable length messages 214 and 218. UEs 115-a and 115-b may or may not be communicating with each other, on the same channel, or even in the same unlicensed band.

Figure 3:
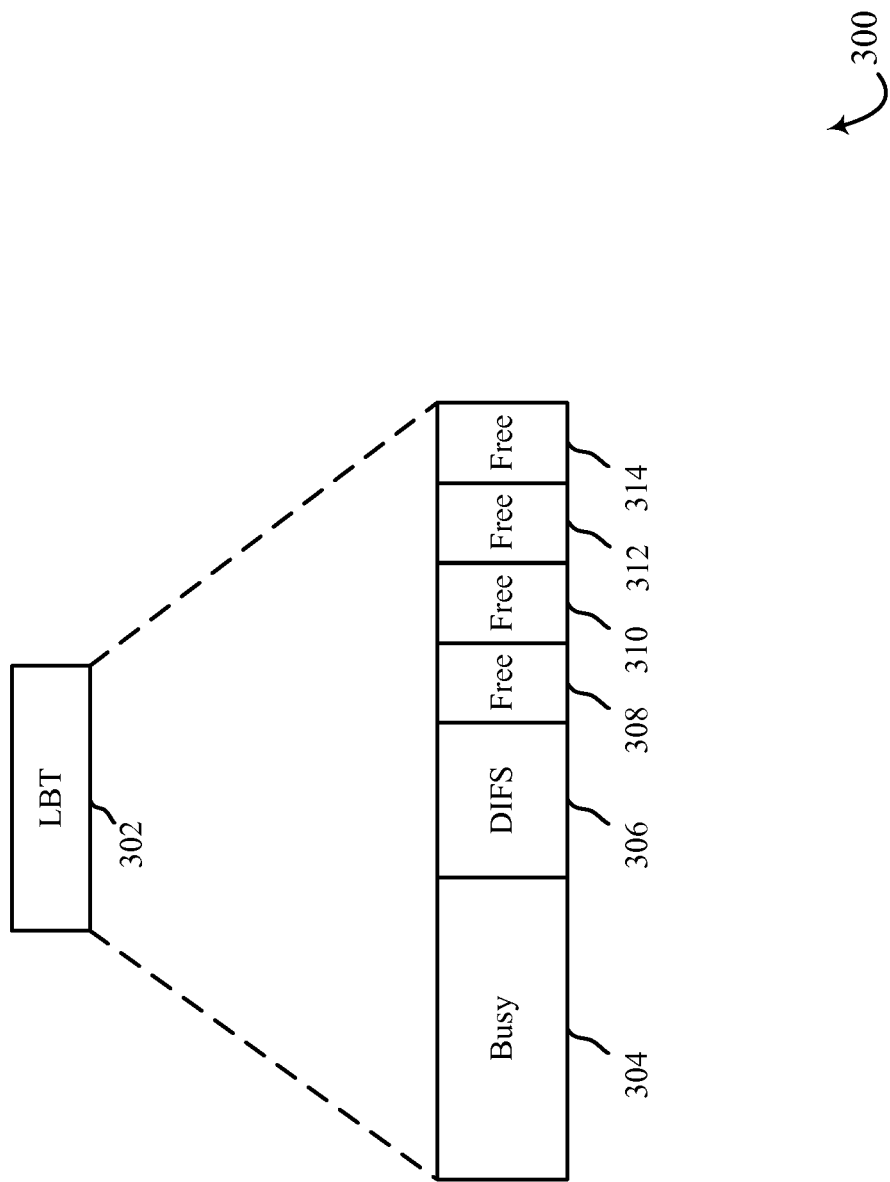
FIG. 3 shows a diagram of aspects of an example listen-before-talk procedure, in accordance with various aspects of the present disclosure.

FIG. 3 shows a diagram 300 of an example LBT procedure 302 used for communicating on a channel in an unlicensed band of a wireless communication system, in accordance with various aspects of the present disclosure. Aspects of the diagram 300 may be implemented by a wireless node, such as a UE 115 described with reference to FIGS. 1-2. In some examples, a system device, such as one of the UEs 115 may execute one or more sets of codes to control the functional elements of the device to perform some or all of the functions described below relating to LBT procedure 302.

As previously discussed, UEs 115 configured for direct communications on a channel in an unlicensed band may perform an LBT procedure on the channel. Aspects of an example LBT procedure 302 may include a busy period 304, followed by a distributed coordination function (DCF) interframe space (DIFS) period 306 and a plurality of free periods 308, 310, 312, and 314. During the busy period 304, the UE 115 may detect or measure energy on the channel in the unlicensed band. The detected energy may be greater than a threshold level. Therefore, the LBT procedure 302 may transition to a DIFS period 306. The DIFS period 306 generally corresponds to a period in which the UE 115 senses the channel as idle. In some examples, the busy period 304 may also be a DIFS period 306. The free periods 308-314 generally correspond to additional periods in which the UE 115 must sense the channel as idle before declaring the channel as available. Although LBT procedure 302 shows four free periods 308-314, it is to be understood that more or fewer free periods may be used.

Figure 4:
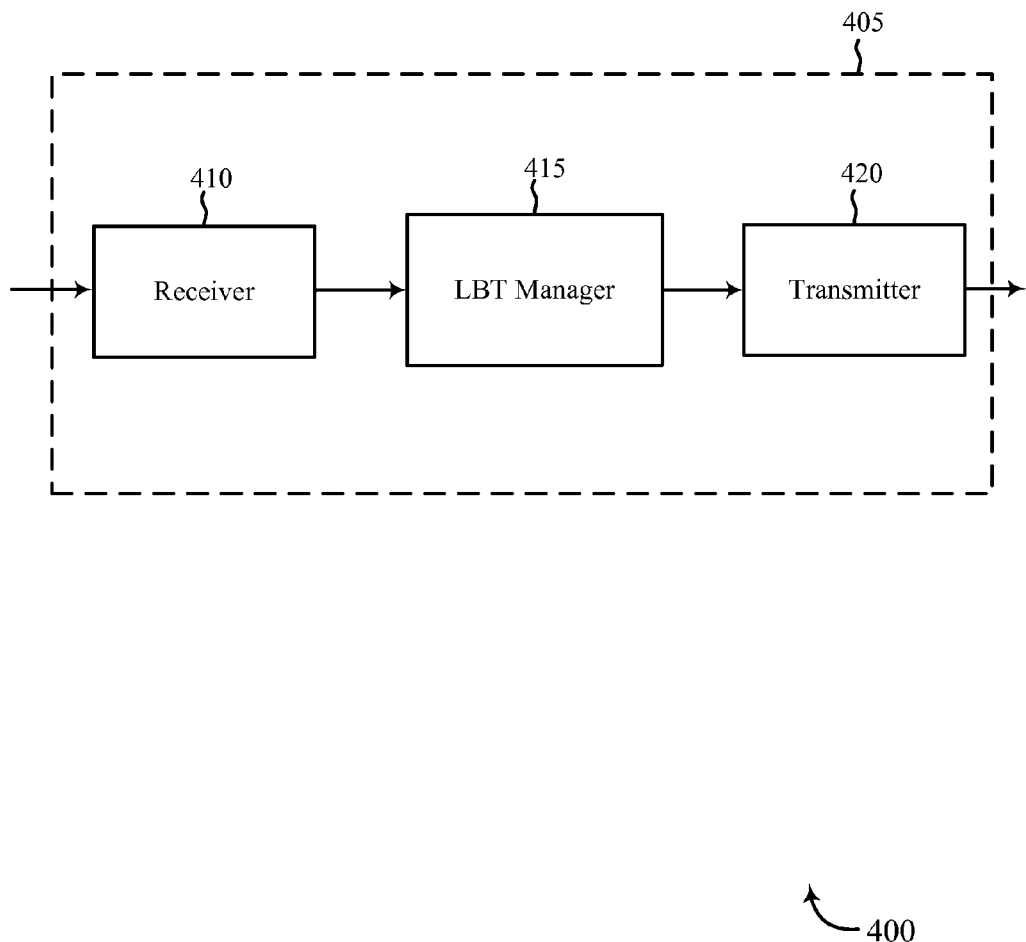
FIG. 4 shows a block diagram of a device configured for use in wireless communication, in accordance with various aspects of the present disclosure.

FIG. 4 shows a block diagram 400 of a device 405 for use in wireless communication, in accordance with various aspects of the present disclosure. The device 405 may be an example of one or more aspects of a wireless node, such as a UE 115 described with reference to FIGS. 1-3. The device 405 may include a receiver 410, a listen-before-talk (LBT)

manager 415, and/or a transmitter 420. The device 405 may also be or include a processor. Each of these modules may be in communication with each other.

The components of the device 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors.

The receiver 410 may receive information such as packets, user data, and/or control information associated with various information channels (e.g., control channels, data channels, etc.). The receiver 410 may be configured to receive various messages related to supporting an LBT procedure on a channel in an unlicensed band. Information may be passed on to the LBT manager 415, and to other components of the device 405.

The LBT manager 415 may monitor, control, provide a means for, or otherwise manage aspects of a LBT procedure on a channel in an unlicensed band for the device 405. For example, the LBT manager 415 may perform an LBT procedure on the channel in the unlicensed band in a first subframe. The LBT manager 415 may identify a time period between a completion of the LBT procedure and a boundary of a second subframe. The LBT manager 415 may transmit a Wi-Fi preamble and a variable length message on the channel during the identified time period. The variable length message may include a duration that is time aligned with the boundary of the second subframe.

The transmitter 420 may transmit the one or more signals received from other components of the device 405. The transmitter 420 may transmit various frames or messages related direct communications on a channel in an unlicensed band. In some examples, the transmitter 420 may be collocated with the receiver 410 in a transceiver module.

Figure 5:
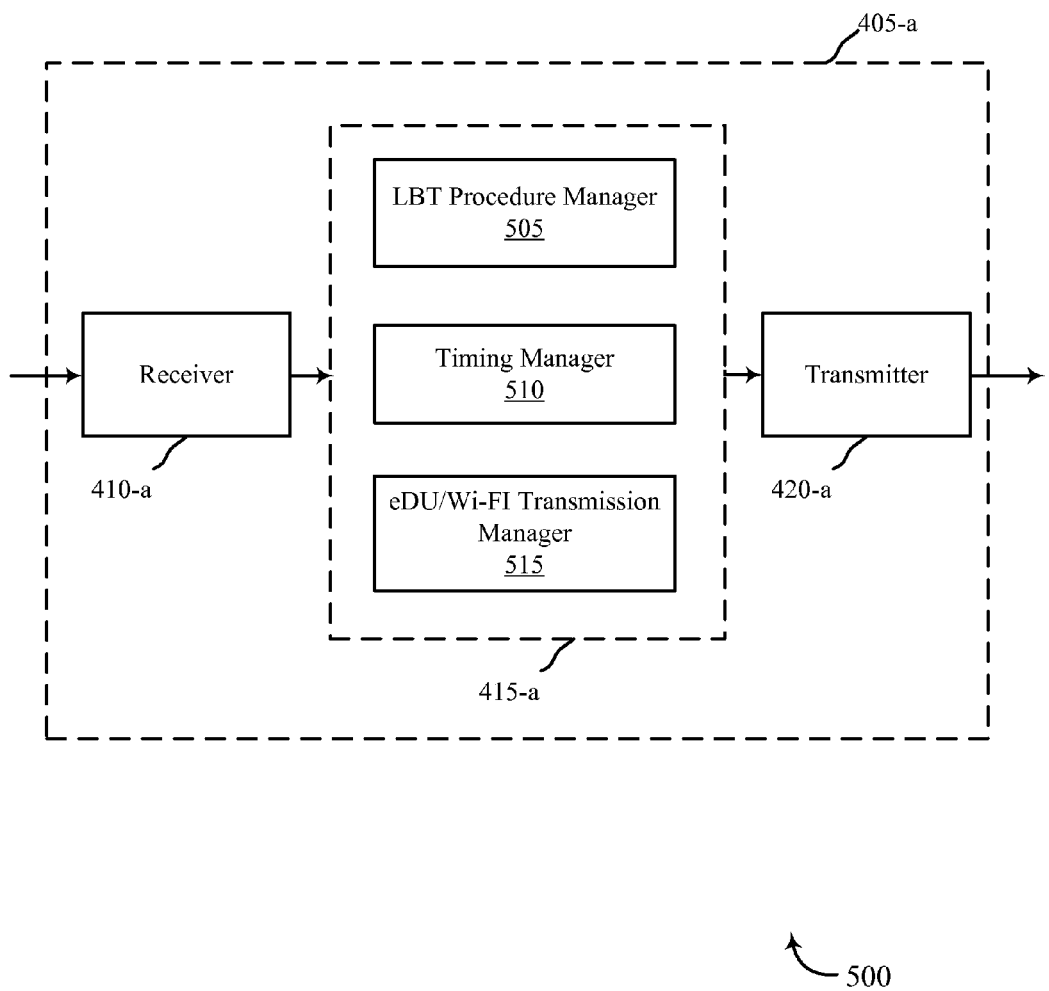
FIG. 5 shows a block diagram of a device configured for use in wireless communication, in accordance with various aspects of the present disclosure.

FIG. 5 shows a block diagram 500 of a device 405-a for use in wireless communication, in accordance with various examples. The device 405-a may be an example of one or more aspects of a UE 115 described with reference to FIGS. 1-3. It may also be an example of a device 405 described with reference to FIG. 4. The device 405-a may include a receiver 410-a, a LBT manager 415-a, and/or a transmitter 420-a, which may be examples of the corresponding modules of device 405. The device 405-a may also include a processor. Each of these components may be in communication with each other. The LBT manager 415-a may include a LBT procedure manager 505, a timing manager 510, and an eDU/Wi-Fi transmission manager 515. The receiver 410-a and the transmitter 420-a may perform the functions of the receiver 410 and the transmitter 420, of FIG. 4, respectively.

The LBT procedure manager 505 may monitor, control, provide a means for, or otherwise manage aspects of an LBT procedure for the device 405-a. The LBT procedure manager 505 may perform the LBT procedure on a channel in an unlicensed radio frequency spectrum band. The channel may be associated with D2D direct communications in the unlicensed radio frequency spectrum band. The LBT procedure manager 505 may select a pseudo-random backoff interval associated with the LBT procedure. The pseudo-random backoff interval may be selected based at least in part on a system time associated with communications on the channel. The LBT procedure manager 505 may decode, during the LBT procedure, a header portion of one or more received Wi-Fi signals and determine that the LBT procedure is complete based on the decoded header portion.

The timing manager 510 may monitor, control, provide a means for, or otherwise manage aspects of timing for the device 405-a. The timing manager 510 may identify a time period between a completion of the LBT procedure and a boundary of a second subframe. The timing manager 510 may select a duration of a variable length message based on a maximum LBT procedure time, an actual LBT procedure time, and a Wi-Fi preamble time. The timing manager 510 may select a duration of the variable length message based on a fixed LBT procedure time, an actual LBT procedure time, and a Wi-Fi preamble time. The timing manager 510 may select a duration of the variable length message to time align frames transmitted on the channel with frames transmitted on a channel in a licensed radio frequency spectrum band.

The eDU/Wi-Fi transmission manager 515 may monitor, control, provide a means for, or otherwise manage aspects of transmission of a Wi-Fi preamble and a variable length message (eDU message) for the device 405-a. The eDU/Wi-Fi transmission manager 515 may transmit the Wi-Fi preamble and the variable length message on the channel during the identified time period. The variable length message may include the duration that is time aligned with the boundary of the second subframe. The Wi-Fi preamble may include a CTS-S information element that is configured to reserve the channel during a remaining portion of the time period. The CTS-S information element may include a destination address selected to reserve the channel during the remaining portion of the time period.

Figure 6:
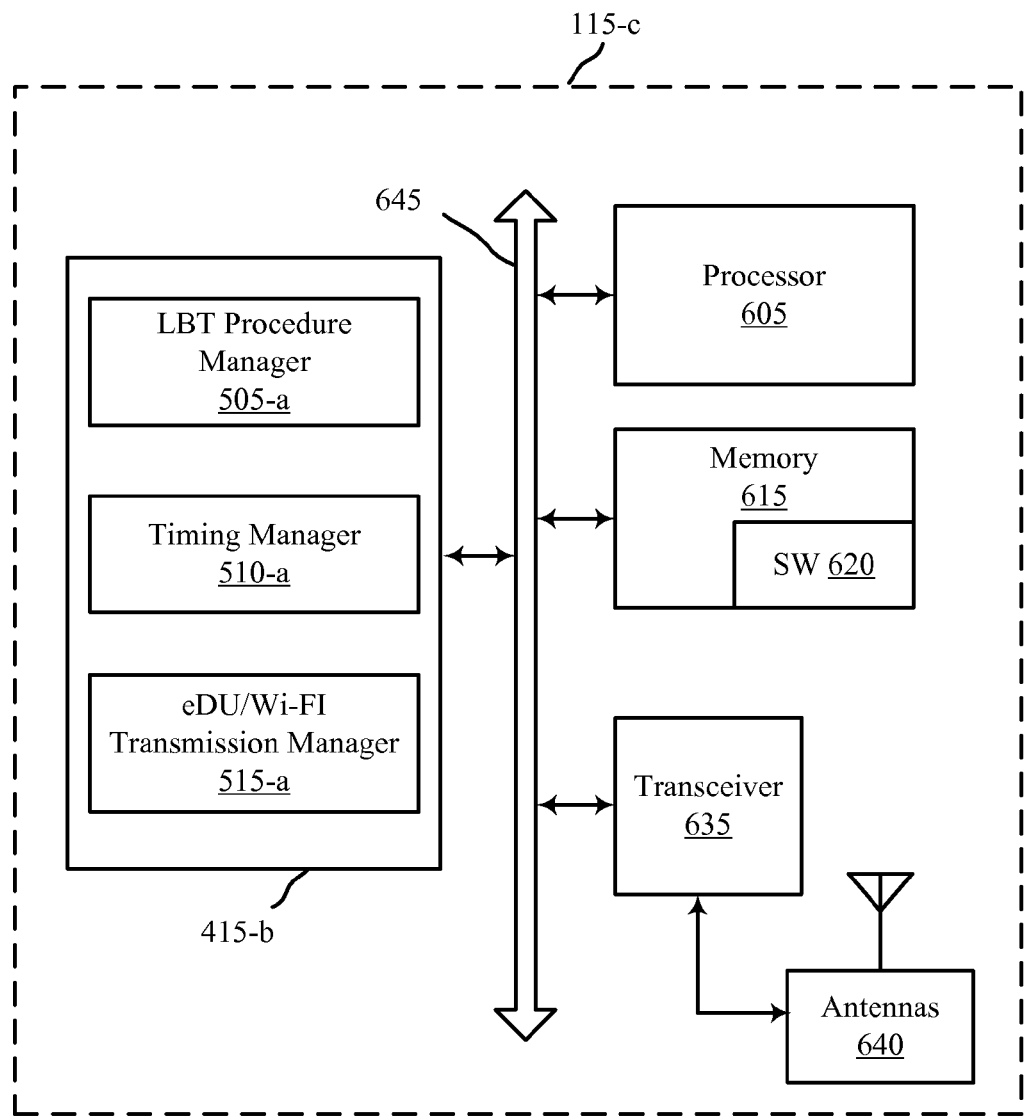
FIG. 6 shows a block diagram of a wireless communication system, in accordance with various aspects of the present disclosure.

FIG. 6 shows a system 600 for use in wireless communication, in accordance with various examples. System 600 may include a UE 115-c, which may be an example of the UEs 115 of FIGS. 1-3. UE 115-c may also be an example of one or more aspects of devices 405 of FIGS. 4 and 5. UE 115-c may be configured for direct communications on a channel in an unlicensed radio frequency spectrum band.

The UE 115-c may generally include components for bi-directional voice and data communications including components for transmitting communications and components for receiving communications. The UE 115-c may include antenna(s) 640, a transceiver 635, a processor 605, and memory 615 (including software (SW) 620), which each may communicate, directly or indirectly, with each other (e.g., via one or more buses 645). The transceiver 635 may be configured to communicate bi-directionally, via the antenna(s) 640 and/or one or more wired or wireless links, with one or more networks, as described above. For example, the transceiver 635 may be configured to communicate bi-directionally with UEs 115 with reference to FIGS. 1-5. The transceiver 635 may include a modem configured to modulate the packets and provide the modulated packets to the antenna(s) 640 for transmission, and to demodulate packets received from the antenna(s) 640. While the UE 115-c may include a single antenna 640, the UE 115-c may have multiple antennas 640 capable of concurrently transmitting and/or receiving multiple wireless transmissions. The transceiver 635 may be capable of concurrently communicating with one or more UEs 115 via multiple component carriers.

The UE 115-c may include a LBT manager 415-b, which may perform the functions described above for the LBT manager 415 of device 405 of FIGS. 4 and 5. For example, the LBT manager 415-b may include a LBT procedure manager 505-a, a timing manager 510-a, and an eDU/Wi-Fi transmission manager 515-a, which may be examples of and perform the functions of the LBT procedure manager 505, the timing manager 510, and the eDU/Wi-Fi transmission manager 515, respectively, described with reference to FIG. 5.

The memory 615 may include random access memory (RAM) and read-only memory (ROM). The memory 615 may store computer-readable, computer-executable software/firmware code 620 containing instructions that are configured to, when executed, cause the processor 605 to perform various functions described herein (e.g., support direct communications in a subframe on a channel in an unlicensed radio frequency spectrum band, etc.). Alternatively, the computer-readable, computer-executable software/firmware code 620 may not be directly executable by the processor 605 but be configured to cause a computer (e.g., when compiled and executed) to perform functions described herein. The processor 605 may include an intelligent hardware device, e.g., a central processing unit (CPU), a microcontroller, an application-specific integrated circuit (ASIC), etc.

Figure 7:
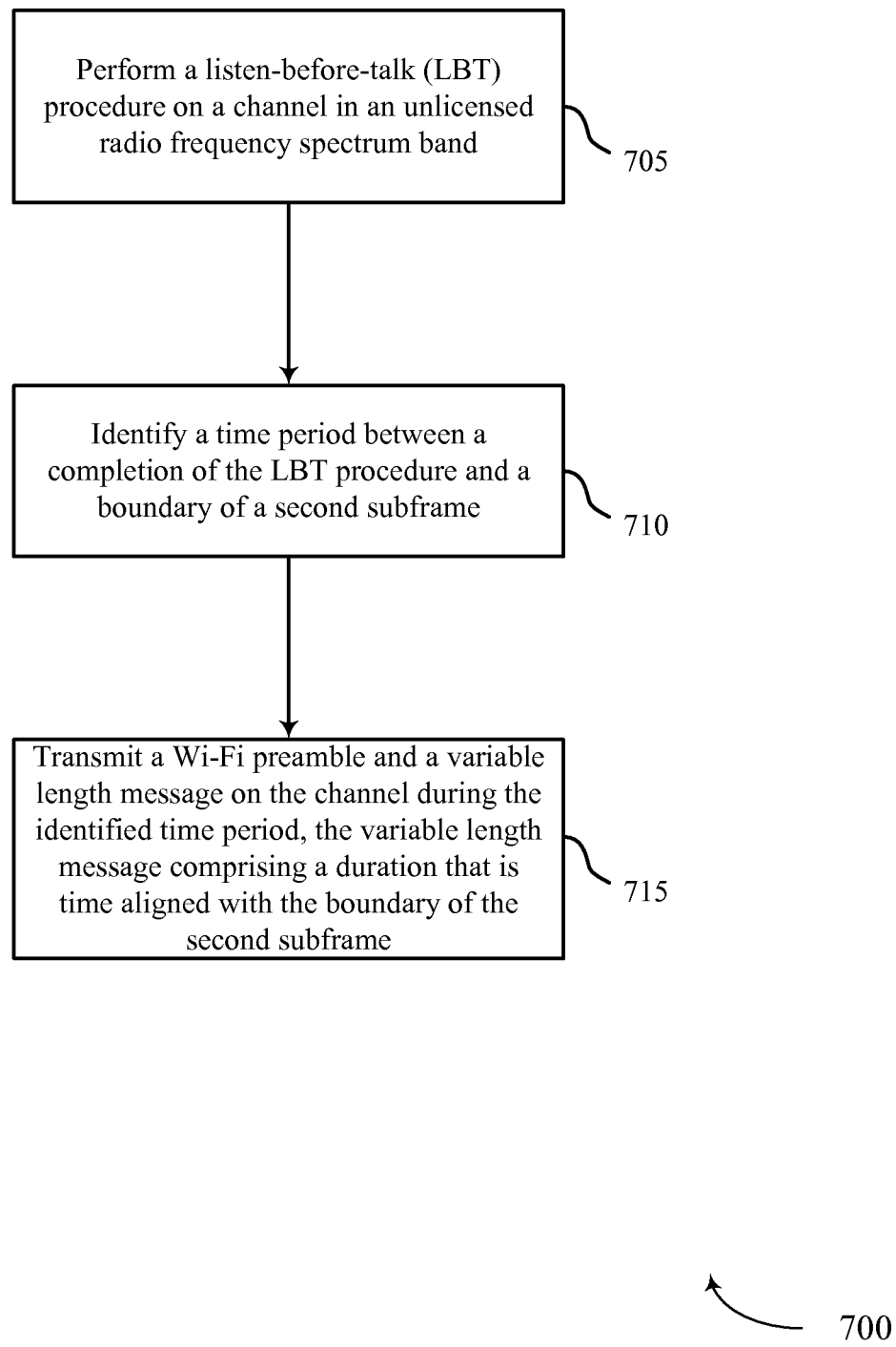
FIG. 7 is a flow chart illustrating an example of a method for wireless communication, in accordance with various aspects of the present disclosure.

FIG. 7 is a flow chart illustrating an example of a method 700 for wireless communication, in accordance with various aspects of the present disclosure. For clarity, the method 700 is described below with reference to aspects of one or more of the UEs 115 described with reference to FIGS. 1-3 and 6, and/or aspects of one or more of the devices 405 described with reference to FIGS. 4 and 5. In some examples, a UE may execute one or more sets of codes to control the functional elements of the UE to perform the functions described below. Additionally or alternatively, the UE may perform one or more of the functions described below using special-purpose hardware.

At block 705, the method 700 may include the UE performing a LBT procedure on a channel in an unlicensed radio frequency spectrum band. The operation(s) at block 705 may be performed using the LBT procedure manager 505 described with reference to FIGS. 5 and 6.

At block 710, the method 700 may include the UE identifying a time period between a completion of the LBT procedure and a boundary of a second subframe. The operation(s) at block 710 may be performed using the timing manager 510 described with reference to FIGS. 5 and 6.

At block 715, the method 700 may include the UE transmitting a Wi-Fi preamble and a variable length message on the channel during the identified time period. The variable length message may include a duration that is time aligned with the boundary of the second subframe. The operation(s) at block 715 may be performed using the eDU/Wi-Fi transmission manager 515 described with reference to FIGS. 5 and 6.

Figure 8:
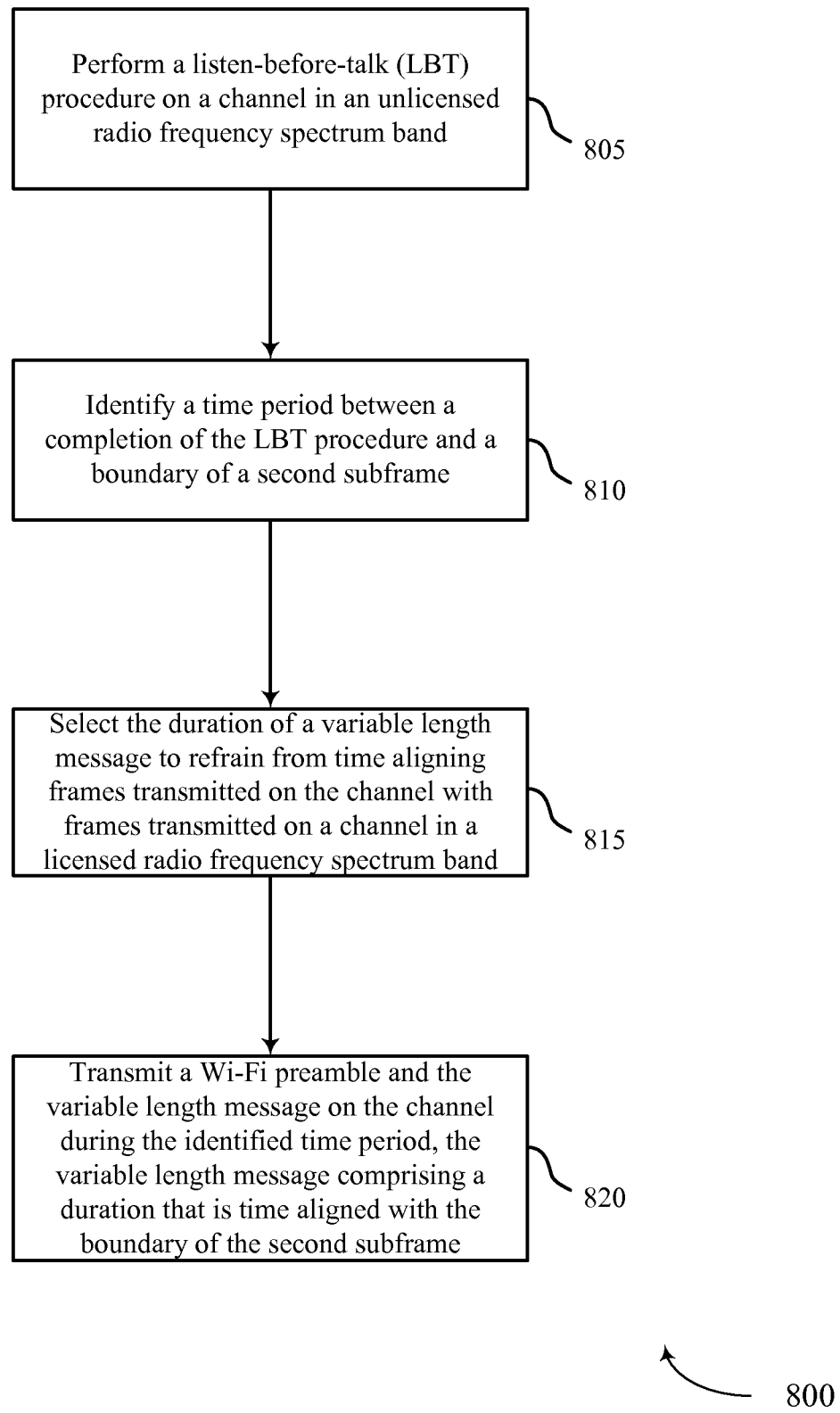
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of one or more of the UEs 115 described with reference to FIGS. 1-3 and 6, and/or aspects of one or more of the devices 405 described with reference to FIGS. 4 and 5. In some examples, a UE may execute one or more sets of codes to control the functional elements of the UE to perform the functions described below. Additionally or alternatively, the UE may perform one or more of the functions described below using special-purpose hardware.

At block 805, the method 800 may include the UE performing a LBT procedure on a channel in an unlicensed radio frequency spectrum band. The operation(s) at block 805 may be performed using the LBT procedure manager 505 described with reference to FIGS. 5 and 6.

At block 810, the method 800 may include the UE identifying a time period between a completion of the LBT procedure and a boundary of a second subframe. The operation(s) at block 810 may be performed using the timing manager 510 described with reference to FIGS. 5 and 6.

At block 815, the method 800 may include the UE selecting a duration of a variable length message to time align frames transmitted on the channel with frames transmitted on a channel in the licensed radio frequency spectrum band. The operations at block 815 may be performed using the timing manager 510 described with reference to FIGS. 5 and 6.

At block 820, the method 800 may include the UE transmitting a Wi-Fi preamble and a variable length message on the channel during the identified time period. The variable length message may include a duration that is time aligned with the boundary of the second subframe. The operation(s) at block 820 may be performed using the eDU/Wi-Fi transmission manager 515 described with reference to FIGS. 5 and 6.

Thus, the methods 700 and 800 may provide for wireless communications. It should be noted that the methods 700 and 800 are just example implementations and that the operations of the methods 700 and 800 may be rearranged or otherwise modified such that other implementations are possible. In some examples, aspects from two or more of the methods 700 or 800 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
    performing, during a first subframe, a listen-before-talk (LBT) procedure on a channel in an unlicensed radio frequency spectrum band;
    identifying a time period between completion of the LBT procedure and a boundary of a second subframe;
    selecting a duration of a variable length message based at least in part on a fixed LBT procedure time, an actual LBT procedure time, and a Wi-Fi preamble time, the selected duration establishing synchronization to time align frames transmitted on the channel with licensed frames transmitted on a licensed channel of a licensed radio frequency spectrum band; and
    transmitting, on the channel during the identified time period, a Wi-Fi preamble and the variable length message according to the selected duration such that the variable length message is time aligned with the boundary of the second subframe.

2. The method of claim 1, further comprising:
    selecting a pseudo-random backoff interval associated with the LBT procedure, the pseudo-random backoff interval selected based at least in part on a system time associated with communications on the channel.

3. The method of claim 2, wherein the duration of the pseudo-random backoff interval associated with the LBT procedure is the same for each device configured for communication on the channel.

4. The method of claim 1, further comprising:
transmitting a clear-to-send-to-self (CTS-S) information element in the Wi-Fi preamble, the CTS-S information element configured to reserve the channel during a remaining portion of the identified time period.

5. The method of claim 4, wherein the CTS-S information element comprises a fixed destination address selected to reserve the channel during the remaining portion of the identified time period.

6. The method of claim 1, further comprising:
decoding, during the LBT procedure, a header portion of one or more received Wi-Fi signals; and
determining that the LBT procedure is complete based at least in part on the decoded header portion.

7. The method of claim 1, wherein the channel is associated with device-to-device (D2D) direct communications in the unlicensed radio frequency spectrum band.

8. The method of claim 1, wherein the variable length message comprises at least one of a pilot signal transmission or a transmission of buffered data.

9. The method of claim 1, wherein the fixed LBT procedure time is a maximum LBT procedure time.

10. An apparatus for wireless communication, comprising:
a processor;
memory in electronic communication with the processor; and
instructions stored in the memory, the instructions being executable by the processor to:
perform, during a first subframe, a listen-before-talk (LBT) procedure on a channel in an unlicensed radio frequency spectrum band;
identify a time period between completion of the LBT procedure and a boundary of a second subframe;
select a duration of a variable length message based at least in part on a fixed LBT procedure time, an actual LBT procedure time, and a Wi-Fi preamble time, the selected duration establishing synchronization to time align frames transmitted on the channel with licensed frames transmitted on a licensed channel in a licensed radio frequency spectrum band; and
transmit, on the channel during the identified time period, a Wi-Fi preamble and the variable length message according to the selected duration such that the variable length message is time aligned with the boundary of the second subframe.

11. The apparatus of claim 10, further comprising instructions executable by the processor to:
select a pseudo-random backoff interval associated with the LBT procedure, the pseudo-random backoff interval selected based at least in part on a system time associated with communications on the channel.

12. The apparatus of claim 11, wherein the duration of the pseudo-random backoff interval associated with the LBT procedure is the same for each device configured for communication on the channel.

13. The apparatus of claim 10, further comprising instructions executable by the processor to:
transmit a clear-to-send-to-self (CTS-S) information element in the Wi-Fi preamble, the CTS-S information element configured to reserve the channel during a remaining portion of the identified time period.

14. The apparatus of claim 13, wherein the CTS-S information element comprises a fixed destination address selected to reserve the channel during the remaining portion of the identified time period.

15. The apparatus of claim 10, further comprising instructions executable by the processor to:
decoding, during the LBT procedure, a header portion of one or more received Wi-Fi signals; and
determining that the LBT procedure is complete based at least in part on the decoded header portion.

16. The apparatus of claim 10, wherein the channel is associated with device-to-device (D2D) direct communications in the unlicensed radio frequency spectrum band.

17. The apparatus of claim 10, wherein the variable length message comprises at least one of a pilot signal transmission or a transmission of buffered data.

18. The apparatus of claim 10, wherein the fixed LBT procedure time is a maximum LBT procedure time.

19. An apparatus for wireless communication, comprising:
means for performing, during a first subframe, a listen-before-talk (LBT) procedure on a channel in an unlicensed radio frequency spectrum band;
means for identifying a time period between completion of the LBT procedure and a boundary of a second subframe;
means for selecting a duration of a variable length message based at least in part on a fixed LBT procedure time, an actual LBT procedure time, and a Wi-Fi preamble time, the selected duration establishing synchronization to time align frames transmitted on the channel with licensed frames transmitted on a licensed channel in a licensed radio frequency spectrum band; and
means for transmitting, on the channel during the identified time period, a Wi-Fi preamble and the variable length message according to the selected duration such that the variable length message is time aligned with the boundary of the second subframe.

20. The apparatus of claim 19, further comprising:
means for selecting a pseudo-random backoff interval associated with the LBT procedure, the pseudo-random backoff interval selected based at least in part on a system time associated with communications on the channel.

21. The apparatus of claim 20, wherein the duration of the pseudo-random backoff interval associated with the LBT procedure is the same for each device configured for communication on the channel.

22. The apparatus of claim 19, further comprising:
means for transmitting a clear-to-send-to-self (CTS-S) information element in the Wi-Fi preamble, the CTS-S information element configured to reserve the channel during a remaining portion of the identified time period.

23. The apparatus of claim 22, wherein the CTS-S information element comprises a fixed destination address selected to reserve the channel during the remaining portion of the identified time period.

24. The apparatus of claim 19, further comprising:
means for decoding, during the LBT procedure, a header portion of one or more received Wi-Fi signals; and
means for determining that the LBT procedure is complete based at least in part on the decoded header portion.

25. The apparatus of claim 19, wherein the channel is associated with device-to-device (D2D) direct communications in the unlicensed radio frequency spectrum band.

26. The apparatus of claim 19, wherein the variable length message comprises at least one of a pilot signal transmission or a transmission of buffered data.

27. The apparatus of claim 19 wherein the fixed LBT procedure time is a maximum LBT procedure time.

28. A non-transitory computer-readable medium storing code for wireless communication, the code executable by a processor to:
perform, during a first subframe, a listen-before-talk (LBT) procedure on a channel in an unlicensed radio frequency spectrum band;
identify a time period between completion of the LBT procedure and a boundary of a second subframe;
select a duration of a variable length message based at least in part on a fixed LBT procedure time, an actual LBT procedure time, and a Wi-Fi preamble time, the selected duration establishing synchronization to time align frames transmitted on the channel with licensed frames transmitted on a licensed channel in a licensed radio frequency spectrum band; and
transmit, on the channel during the identified time period, a Wi-Fi preamble and the variable length message according to the selected duration such that the variable length message is time aligned with the boundary of the second subframe.

29. The non-transitory computer-readable medium of claim 28, further comprising code executable by the processor to:
select a pseudo-random backoff interval associated with the LBT procedure, the pseudo-random backoff interval selected based at least in part on a system time associated with communications on the channel.

30. The non-transitory computer-readable medium of claim 29, wherein the duration of the pseudo-random backoff interval associated with the LBT procedure is the same for each device configured for communication on the channel.

31. The non-transitory computer-readable medium of claim 28, further comprising code executable by the processor to:
transmit a clear-to-send-to-self (CTS-S) information element in the Wi-Fi preamble, the CTS-S information element configured to reserve the channel during a remaining portion of the identified time period.

32. The non-transitory computer-readable medium of claim 31, wherein the CTS-S information element comprises a fixed destination address selected to reserve the channel during the remaining portion of the identified time period.

33. The non-transitory computer-readable medium of claim 28, wherein the variable length message comprises at least one of a pilot signal transmission or a transmission of buffered data.

34. The non-transitory computer-readable medium of claim 28, wherein the fixed LBT procedure time is a maximum LBT procedure time.

* * * * *